Patented Feb. 19, 1952

2,586,652

UNITED STATES PATENT OFFICE 2,586,652

MANUFACTURE OF INTERPOLYMERS OF STYRENE WITH POLYHYDRIC ALCOHOLIC MIXED ESTERS AND OF COATING COMPOSITIONS OBTAINED THEREFROM

Donald Helmsley Hewitt and Frank Armitage, London, England; Ernest Booth and Richard Hartlebury Buckle, executors of said Donald Helmsley Hewitt, deceased, assignors, by mesne assignments, to The Sherwin-Williams Company, Cleveland, Ohio, a corporation of Ohio No Drawing. Application February 11, 1947, Serial No. 727,952. In Great Britain February 15, 1946

13 Claims. (Cl. 260—23)

This invention is for improvements in or relating to the manufacture of interpolymers of styrene with polyhydric alcoholic mixed esters and of coating compositions obtained therefrom.

Whereas in our prior British Patent No. 573,809 we have broadly disclosed the copolymerisation of aromatic vinyl hydrocarbons (particularly styrene) with partially polymerised polyhydric alcoholic mixed esters containing a substantial proportion of unsaturated fatty acid radicles, the examples in that specification are confined to the use of esters containing conjugated di-ene fatty acid radicles and/or substantially non-conjugated tri-ene fatty acid radicles.

We have now discovered that the reaction leads more readily to compatible products when the polymeric mixed ester contains a proportion of conjugated triene fatty acid radicles in association with unsaturated fatty acid radicles of other types.

By the expression "partially polymerised polyhydric alcoholic mixed ester containing conjugated triene fatty acid radicles" we mean a partially polymerised ester or mixture of esters of a polyhydric alcohol or alcohols containing a mixture of fatty acid radicals, of which a proportion are conjugated tri-ene acid radicles and a proportion are unsaturated fatty acid radicles of other types; the definition includes the products of the heat treatment of two or more fatty acid esters of polyhydric alcohols one of which contains a high proportion of fully conjugated triene fatty acid radicles such as tung oil or oiticica oil which heat treatment, as a result of ester interchange or other reaction, produces a partially polymerised product containing the said different types of unsaturated fatty acids; the definition also includes the products obtained from the condensation polymerisation of one or more polyhydric alcohols with one or more polybasic organic acids and a mixture of the said different types of unsaturated fatty acids to form an alkyd resin. It will be appreciated that in the preparation of an alkyd resin from the polybasic organic acid or acids, the polyhydric alcohol or alcohols and the different types of fatty acids or their partial esters, the reaction proceeds through the intermediate formation of mixed esters of the polyhydric alcohol or alcohols in which the esterifying acids are different and which contain free carboxy and/or hydroxy groups so that they undergo a further condensation polymerisation to form partially polymerised polyhydric alcoholic mixed esters containing the different types of unsaturated fatty acid radicals.

Amongst the conjugated triene fatty acid radicles which may be present there may be mentioned the radicles of naturally-occurring or synthetic fully conjugated acids, such as licanic or eleostearic acids, alone or in combination with synthetic partially conjugated acid radicles, such as are obtained to some extent by the isomerisation of linseed oil or its fatty acids. The proportion of conjugated tri-ene fatty acid radicles contained in the said polyhydric alcoholic mixed ester which is necessary to give homogeneous products depends upon the nature of the other fatty acid radicles present in the mixed ester and the most suitable proportions can readily be discovered by simple tests as will hereinafter be described in the examples given.

As examples of polyhydric alcoholic mixed esters there may be mentioned those formed from glycerol and the fatty acids of drying oils. As examples of other suitable polyhydric alcoholic mixed esters for use in carrying out the present process, there may be mentioned those in which the glycerol is replaced by penta-erythritol, mannitol or sorbitol, whilst in place of part of the fatty acids of drying oils there may be used the fatty acids of semi-drying or non-drying oils, or the acids of natural resins such as rosin or copal; alternatively there may be employed as the polyhydric alcoholic mixed esters those formed from glycerol and/or other polyhydric alcohols, one or more of the groups of acids above mentioned and a polybasic acid (or anhydride thereof) such as phthalic acid; in the latter case, the products are alkyd resins as referred to above.

According to the present invention, therefore, there is provided a process which comprises interpolymerising styrene with one or more partially polymerised polyhydric alcoholic mixed esters containing conjugated triene fatty acid radicles.

The interpolymerisation reaction is preferably effected in the presence of a common solvent for the ingredients of the reaction mixture; as an alternative to effecting the interpolymerisation in solution, it may be effected in a two phase system of which the continuous phase is an aqueous medium.

In our prior British Patent No. 573,835 we have described in detail the advantages of commencing the reaction with a portion only of the requisite quantity of styrene and adding the remainder of the styrene as the reaction proceeds and it is therefore a feature of the present invention that a portion only of the requisite quantity of the styrene is added at the commencement of the reaction and the remainder of the styrene is added continuously or intermittently during the course of the reaction; conveniently the amount of styrene added at the commencement of the reaction is about 25 per cent of the total quantity of styrene to be added.

The detailed information concerning this particular mode of operation contained in our prior British Patent No. 573,835 is applicable directly to the present process and such information should be deemed to form part of this specification.

Furthermore, in our copending British application No. 580,912 we have described the interesting effects of the presence of terpenes on the course of the reaction, the effect consisting in a slowing down of the rate of interpolymerisation thereby making it the more readily possible to produce compatible products containing high proportions of styrene. The same effects are obtainable in the process of the present invention and, accordingly, it is a further feature of the invention that, where a solvent is employed, such solvent comprises a terpene. The terpene is preferably a mono- or di-cyclic alpha-terpene as we have found that dipentene is particularly efficacious in bringing about the effects of a slower reaction, greater compatibility and higher styrene content of the interpolymer when the dipentene is used either alone or together with a further solvent or solvents which may comprise other terpenes; the other solvents may be aliphatic solvents such as white spirit or they may be aromatic solvents such as xylol (commercial xylene).

According to yet a further feature of the invention the said terpene or terpenes may be added to the reaction mixture during the course of the reaction and this addition may be either continuous or intermittent.

The detailed information contained in our copending British application No. 580,912 concerning the use and effects of the terpene solvents should be deemed to form a part of this specification.

The following examples illustrate various modes in which the invention may be carried into effect, the parts and percentages quoted being calculated as by weight:

*Example I.*—A number of experiments were carried out in which various oils were admixed with styrene and commercial xylene in weight ratios of 25:25:50 and the experiments were carried out by refluxing the mixtures for 20 hours (with the exception of Experiments 8 and 9 in which the time of refluxing was 15 hours). The reaction products were solutions of the styrene oil interpolymers and the properties thereof are set out in the following table:

| Experiment No. | Nature of oil | Characteristics of interpolymer solution | | |
|---|---|---|---|---|
| | | Viscosity in secs. in Ford No. 4 Cup at 25° C. | Solids content of solution percent | Nature of Film |
| 1 | Alkali refined linseed oil | 14 | 46 | Opaque. |
| 2 | Raw linseed oil | 14 | 42 | Do. |
| 3 | 30 poise linseed stand oil | 38 | 46 | Do. |
| 4 | 3 poise high temperature blown linseed oil | 22 | 45 | Opalescent. |
| 5 | 10 poise high temperature blown linseed oil | 36 | 43 | Clear. |
| 6 | 20 poise high temperature blown linseed oil | 53 | 44 | Do. |
| 7 | 30 poise high temperature blown linseed oil | 54 | 46 | Do. |
| 8 | 46 poise high temperature blown linseed oil | 60 | 45 | Do. |
| 9 | 130 poise high temperature blown linseed oil | 120 | 46 | Opalescent. |
| 10 | 1 poise low temperature blown linseed oil | 19 | 42 | Do. |
| 11 | 5 poise low temperature blown linseed oil | 16 | 40 | Clear. |
| 12 | 20 poise low temperature blown linseed oil | 16 | 40 | Do. |

It is clear from this table that the high temperature (100° to 120° C.) blown oils, which probably contain greater proportions of conjugated unsaturation, interpolymerize much more readily than the unblown oils whilst those blown at low temperatures (30°–80° C.) are intermediate in character. Films formed from the solutions of experiments 5 to 12 dry with the addition of the usual driers to hard, tough coatings.

*Example II.*—The following mixture:

120 parts of a 2:1 mixture of raw oiticica and linseed oils preheated to give a viscosity of 22 poises,
80 parts monomeric styrene
130 parts commercial xylene and
10 parts commercial dipentene was refluxed for 28 hours to a Ford No. 4 cup viscosity of 54 secs. at 25° C. at a solids content of 50%. The interpolymer solution yielded clear, non-frosting films drying in about 2 hours after the addition of 2 parts of cobalt naphthenate solution (3% cobalt) and 2 parts of lead naphthenate solution (12% lead).

The xylene and unreacted styrene may be distilled under vacuum and replaced by white spirit.

*Example III.*—The following mixture:

100 parts of a 3:1 mixture of low viscosity preblown linseed oil and raw tung oil which mixture had been heated to a viscosity of 17 poises,
100 parts monomeric styrene
200 parts commercial xylene was refluxed for 35 hours to a Ford No. 4 cup viscosity of 93 secs. at 25° C. at a solids content of 40%. Clear, non-frosting films are produced from the resulting interpolymer solution.

*Example IV.*—The following mixture:

360 parts of a 1:1 mixture 3 poise blown linseed oil and 20 poise dehydrated castor oil which mixture had been preheated to a viscosity of 30 poises
240 parts of monomeric styrene
400 parts of commercial xylene was fluxed for 27 hours to a Ford No. 4 cup viscosity of 100 secs. at 25° C. at 52% solids. Films from this interpolymer solution were clear.

*Example V.*—The following mixture:

25 parts of conjugated linseed oil (as sold under the registered trade-mark "Conlinol" by Messrs. British Oil and Cake Mills Ltd., containing approximately 33% conjugated fatty acid radicles) polymerized to a viscosity of 20 poises
25 parts monomeric styrene
50 parts of white spirit was refluxed for 8½ hours to a viscosity of 170 secs. in the Ford No. 4 cup at 25° C. The interpolymer solution showed a slight opalescence but yielded clear films.

*Example VI.*—One gram molecular weight of pentaerythritol was reacted for two hours at 250° C. with three gram molecular weights of linseed oil fatty acids in the presence of carbon dioxide and with agitation; one gram molecular weight of wood oil fatty acids was then added and the reaction continued for a further two hours until a homogeneous product of an acid value 9.6 was obtained.

A mixture of 200 parts of the partially polymerised polyhydric alcoholic mixed ester thus produced, 200 parts of monomeric styrene and 400 parts of xylol was then heated under reflux for 18 hours to a Ford No. 4 cup viscosity of 100 secs. at 25° C. at a solids content of 46%. The resulting films, after the addition of driers as in Example I, dried in 2 hours to clear coatings which became hard, tough and resistant to solvents.

*Example VII.*—308 parts of raw oiticica oil and 61 parts of glycerine were heated with agitation at 260° C. for one hour in the presence of carbon dioxide. 560 parts of linseed oil fatty acids were added and the reaction continued at the same temperature for 10 hours to a viscosity of 50 poises at 25° C. in the final product.

A mixture of 100 parts of the above partially polymerised polyhydric alcoholic mixed ester, 100 parts of monomeric styrene and 200 parts of xylol was refluxed for 20 hours to a Ford No. 4 cup viscosity of 73 seconds at 25° C. at a solids content of 49%.

*Example VIII.*—To 62.5 parts of a 1% aqueous solution of ammonia were added 2.5 parts of Turkey red oil, 0.2 part of phenol, 7.5 parts of hydrogen peroxide and 2.5 parts of oleic acid. After agitation, a solution of 12.5 parts of a 30 poise tung-linseed stand oil (1:2 tung oil:linseed oil) in 12.5 parts of styrene monomer was added to the aqueous phase at 80° C. and agitation maintained for six hours until substantially all the styrene had polymerised. Films obtained from the resulting stable emulsion were clear but soft.

*Example IX.*—An enamel oil was made by mixing together 800 parts of a 7 poise dehydrated castor oil, 800 parts of a 3 poise blown linseed oil and 8 parts of calcium linoleate. The mixture was heated up to a temperature of 480° F. and was maintained at that temperature for 40 minutes.

400 parts of the enamel oil thus prepared were dissolved, together with 400 parts of monomeric styrene, in 800 parts of commercial xylene and the solution was heated under reflux for 46 hours at the end of which time the solution had a viscosity of 117 seconds in a Ford No. 4 cup at 25° C. and had a solids content of 50%.

*Example X.*—1660 parts of a 20 poise dehydrated castor oil were mixed with 1600 parts of a 3 poise blown linseed oil and the mixture was heated to a temperature of 480° F. and maintained at that temperature for 1½ hours.

540 parts of the enamel oil thus prepared were dissolved, together with 360 parts of monomeric styrene, in 600 parts of commercial xylene and the solution was heated under reflux for 10 hours at the end of which time the solution had a viscosity of 105 seconds in a Ford No. 4 cup at 25° C. and had a solids content of 47.5%. The solution yielded clear films on pouring.

*Example XI.*—540 parts of the enamel oil prepared as described in Example X were dissolved, together with 360 parts of monomeric styrene, in a solvent mixture consisting of 570 parts of commercial xylene and 30 parts of dipentene. The solution was heated under reflux for 38 hours at the end of which time the solution had a viscosity of 90 seconds in a Ford No. 4 cup at 25° C. and had a solids content of 50.6%.

The reaction product was a clear solution which yielded opalescent films on pouring.

*Example XII.*—An enamel oil was prepared by mixing together 200 parts of a 7 poise dehydrated castor oil and 100 parts of oiticica oil and the mixture was then heated to a temperature of 480° F. and was maintained at that temperature for 1 hour; the heated mixture had a viscosity of 16 poises.

72 parts of the enamel oil thus prepared were dissolved, together with 48 parts of monomeric styrene, in a solvent mixture consisting of 70 parts of white spirit and 10 parts of dipentene. The solution was heated under reflux for 11 hours at the end of which time it had a viscosity of 145 seconds in a Ford No. 4 cup at 25° C. and had a solids content of 53.7%.

The reaction product was a slightly opalescent solution which, on pouring, yielded clear films; the solution, when mixed with the customary metallic driers, yielded films which dried by atmospheric oxidation in 2 hours to yield tough durable products.

*Example XIII.*—540 parts of an enamel oil produced by heating together 2 parts of a linseed oil stand oil and 1 part of wood oil were dissolved, together with 360 parts of monomeric styrene, in a solvent mixture consisting of 540 parts of commercial xylene and 60 parts of dipentene. The solution was heated under reflux for 17 hours at the end of which time it had a viscosity of 76 seconds in a Ford No. 4 cup at 25° C. and a solids content of 42%.

*Example XIV.*—An enamel oil was prepared by mixing together 500 parts of a 3 poise blown linseed oil and 250 parts of oiticica oil. The mixture was heated to a temperature of 480° F. and was maintained at that temperature for 50 minutes to produce a product having a viscosity of 22 poises.

120 parts of the enamel oil thus prepared were dissolved, together with 80 parts of monomeric styrene, in a solvent mixture consisting of 123 parts of white spirit and 7 parts of dipentene. The solution was heated under reflux for 17½ hours at the end of which time it had a viscosity of 40 seconds in a Ford No. 4 cup at 25° C. and had a solids content of 52%.

The reaction product was a clear solution which yielded clear films; after addition of the customary metallic driers, the films dried by atmospheric oxidation in 2 hours to a product of excellent durability.

*Example XV.*—An enamel oil was prepared by mixing together 600 parts of a 3 poise blown linseed oil and 200 parts of tung oil and heating it to a temperature of 480° F. and maintaining it at that temperature for ¾ hour to produce a product having a viscosity of 17 poises.

216 parts of the enamel oil thus prepared were dissolved, together with 144 parts of monomeric styrene, in a solvent mixture consisting of 210 parts of white spirit and 30 parts of dipentene. The solution was heated under reflux for 26½ hours at the end of which time it had a viscosity of 83 seconds in a Ford No. 4 cup at 25° C. and had a solids content of 48%. The reaction product was a clear solution from which clear films could be poured.

300 parts of the varnish thus prepared were mixed with 72 parts of rutile titanium oxide and the mixture was ground on a ball mill for 48 hours. After addition of the customary lead and cobalt driers, the paint was found to have excellent brushing properties and a film thereof dried to the touch in about 2½ hours; the film subsequently hardened by atmospheric oxidation to a tough durable film.

*Example XVI.*—An enamel oil was prepared by mixing together 300 parts of a 3 poise blown linseed oil and 300 parts of wood oil. The temperature of the mixture was raised rapidly to 600° F. and the mixture was then allowed to cool.

90 parts of the enamel oil thus prepared were dissolved, together with 60 parts of monomeric styrene, in 60 parts of dipentene. The solution was then heated under reflux for 27 hours at the end of which period it had a viscosity of 220 seconds in a Ford No. 4 cup at 25° C.

A further 40 parts of dipentene were then added to the solution and the heating under reflux was continued for a further 16 hours at the end of which time the reaction product had a viscosity of 80 seconds in a Ford No. 4 cup at 25° C. and had a solids content of 58%.

*Example XVII.*—An enamel oil was prepared by heating 70 parts of wood oil at a temperature of 480° F. for 10 minutes, then adding 140 parts of a 7 poise dehydrated castor oil whilst stirring; the mixture was then maintained at a temperature of 500° F. for a further period of 10 minutes.

70 parts of the enamel oil thus prepared were dissolved, together with 70 parts of monomeric styrene, in 140 parts of turpentine. The solution was then heated under reflux for 19½ hours at the end of which time it had a viscosity of 107 seconds in a Ford No. 4 cup at 25° C. and had a solids content of 44%.

The reaction product was a clear solution which yielded clear films.

*Example XVIII.*—An enamel oil was prepared by mixing 300 parts of a conjugated linseed oil sold under the registered trade-mark "Conlinol" and containing approximately 30% conjugated unsaturation with 150 parts of oiticica oil. The mixture was heated to 480° F. and was maintained at that temperature for 70 minutes to produce a product having a viscosity of 15 poises.

288 parts of the enamel oil thus prepared were dissolved, together with 192 parts of monomeric styrene, in a solvent mixture consisting of 280 parts of white spirit and 40 parts of dipentene. The solution was heated under reflux for 20 hours to a viscosity of 82 seconds in a Ford No. 4 cup at 25° C. and had a solids content of 53.3%. The reaction product was a clear pale coloured solution which yielded clear films.

300 parts of the varnish thus prepared were mixed with 80 parts of titanium dioxide and ground on a ball mill for 48 hours. The product was a paint of good gloss and colour and had excellent brushing characteristics.

After addition of the customary metallic driers, the paint dried within 3 hours, the touch-dry condition subsequently hardening by atmospheric oxidation to a tough film of excellent durabality.

*Example XIX.*—100 parts of a conjugated linseed oil sold under the registered trade-mark "Conlinol" and heated to a viscosity of 6 poise is dissolved, together with 100 parts of monomeric styrene, in 200 parts of commercial xylene. The solution is heated under reflux for 38 hours at the end of which time it had a viscosity of 75 seconds in a Ford No. 4 cup at 25° C. The reaction mixture was a clear solution and, after addition of the customary metallic driers, could be poured to form a clear film which dried in about ¼ hour.

*Example XX.*—50 parts of a conjugated linseed oil sold under the registered trade-mark "Conlinol" and heat treated to a viscosity of 3 poise were dissolved, together with 50 parts of monomeric styrene, in 100 parts of white spirit. The solution was heated under reflux for 44 hours at the end of which time it had a viscosity of 45 seconds in a Ford No. 4 cup at 25° C. The reaction product was a slightly opalescent solution from which, however, clear films could be produced.

*Example XXI.*—314 parts of a conjugated linseed oil sold under the registered trade-mark "Conlinol" and heat treated to a viscosity of 3 poise were dissolved, together with 210 parts of monomeric styrene, in a solvent mixture consisting of 175 parts of commercial xylene and 175 parts of kerosene. The solution was heated under reflux for 40 hours at the end of which time it had a viscosity of 45 seconds in a Ford No. 4 cup at 25° C. and had a solids content of 55%.

*Example XXII.*—252 parts of a conjugated linseed oil sold under the registered trade-mark "Conlinol" and heat treated to a viscosity of 10 poise were dissolved, together with 178 parts of monomeric styrene, in a solvent mixture consisting of 230 parts of alpha-pinene and 40 parts of dipentene. The solution was heated under reflux for 45½ hours to produce a clear solution which had a solids content of 52%. Films poured from the solution were very opalescent.

*Example XXIII.*—An alkyd resin was produced by mixing 153 parts of linseed oil fatty acids and 38 parts of tung oil fatty acids with 62 parts of glycerine, 14 parts of pentaerythritol and 132 parts of phthalic anhydride. The reaction mixture was heated to a temperature of 425° F. over a period of ½ hour and was maintained at that temperature for a further 3 hours. Carbon dioxide was then blown through the reaction mixture whilst it was maintained at 450° F. for a further period of 1 hour. The reaction mixture was then cooled and thinned with commercial xylene to a solids content of 57%. The acid value of the product was 2.3.

100 parts of the above solution of alkyd resin were then dissolved, together with 30 parts of monomeric styrene, in 50 parts of commercial xylene and the solution was heated under reflux for 8½ hours to produce a product having a viscosity of 85 seconds in a Ford No. 4 cup at 25° C. and had a solids content of 42.3. The reaction product was a clear solution yielding clear films which dried to the touch in ¾ hour.

*Example XXIV.*—100 parts of the alkyd resin solution prepared as described in Example XXIII were dissolved, together with 40 parts of monomeric styrene, in a solvent mixture consisting of 70 parts of commercial xylene and 20 parts of dipentene. The solution was heated under reflux for 22 hours at the end of which time it had a viscosity of 18 seconds in a Ford No. 4 cup at 25° C. and had a solids content of 34.6%. The reaction product was a clear solution from which slightly opalescent films could be produced.

*Example XXV.*—An alkyd resin was produced by mixing together 232 parts of linseed oil fatty acid, 18 parts of wood oil fatty acids, 120 parts of glycerine and 222 parts of phthalic anhydride. The mixture was heated to a temperature of 500° F. whilst stirring and was maintained at that temperature for a period of 3 hours.

50 parts of the alkyd resin thus prepared were dissolved, together with 50 parts of monomeric styrene, in 100 parts of commercial xylene and the solution was heated under reflux for 24 hours, at the end of which time the product had a viscosity of 95 seconds in a Ford No. 4 cup at 25° C. and had a solids content of 49%. The reaction product was a varnish yielding a hard tough film which had good stoving properties.

*Example XXVI.*—An alkyd resin was prepared by mixing 336 parts of linseed oil fatty acids, 84 parts of wood oil fatty acids, 127 parts of glycerine and 183 parts of phthalic anhydride and the mixture was heated whilst stirring to a temperature of 450° F. and maintained at that temperature for 2¾ hours.

50 parts of the alkyd resin thus prepared were dissolved, together with 50 parts of monomeric styrene, in 100 parts of commercial xylene. The solution was treated under reflux for 19 hours at the end of which time it had a viscosity of 200 seconds in a Ford No. 4 cup at 25° C. and had a solids content of 52.7%; the high viscosity figure and the high solids content thus obtained were due, in part, to a slight loss of the solvent which occurred during the refluxing operation. The reaction product was a clear solution which yielded a clear film. The film possessed good stoving properties.

From the foregoing examples it will be noted that the proportion of conjugated triene unsaturation in the fatty acid component of the drying oils or drying oil fatty acids varies from about 5.2 to about 52% as shown, for instance, in Examples XXV and II respectively. In Example II the ratio of raw oiticica oil to linseed oil is 2 to 1 and since oiticica oil contains 78.2% licanic acid, a conjugated triene, the proportion of triene in the oil mixture employed is 52%. In Example XXV a mixture of 232 parts of linseed oil fatty acids and 18 parts of wood oil fatty acids are employed. Since wood oil fatty acids contain about 72.8% eleostearic acid, a conjugated triene, the proportion of triene in the fatty acid mixture is 5.2%.

The products of the present invention yield materials whose properties range from balsams to solid materials whilst the ability of the material to dry varies in accordance with the nature and percentage of the various constituents of the final product obtained.

The products of the present invention are particularly useful in the production of coating compositions such as paints owing to the possibility of their conversion to the insoluble state. Some products of the invention are also particularly useful as a basis for stoving enamels for use at low stoving temperatures whilst other applications of the several products of the invention include aircraft and motor-car finishes, electrical insulating material, adhesive material and printing inks whilst they may also be used in moulded compositions and laminated materials and for the coating and impregnation of textile materials.

Some products possess good durability and initial colour and the colour retention of films formed from coating compositions containing the interpolymers according to this invention is excellent.

What we claim is:

1. A process for producing a soluble homogeneous interpolymer having air drying properties comprising heating, at an elevated temperature, a mixture consisting of styrene and not less than an equal amount of a partially polymerized compound selected from the group consisting of the esters formed solely from fatty acids and at least one polyhydric alcohol and fatty acid modified resins formed solely from fatty acids, at least one polyhydric alcohol and phthalic acid, the fatty acid component of said esters and resins being from about 5.2% to about 52% conjugated trienes when in the unpolymerized state, the remainder of said fatty acid component being predominantly unsaturated.

2. A process as claimed in claim 1 wherein the process is carried out in the presence of a solvent for the reactants.

3. A process as claimed in claim 2 wherein the solvent comprises a terpene.

4. A process as claimed in claim 3 wherein the terpene is added periodically during the reaction.

5. A process as claimed in claim 3 wherein the terpene is selected from the class consisting of monocyclic and dicyclic alpha-terpenes.

6. A process as claimed in claim 5 wherein the terpene is dipentene.

7. A process as claimed in claim 1 wherein the process is carried out in a two phase system of which the continuous phase is an aqueous medium.

8. A process as claimed in claim 1 wherein the styrene is added periodically during the reaction.

9. A process as claimed in claim 1 and further comprising heating a mixture of fatty acid esters of polyhydric alcohols to form the partially polymerized compound.

10. A process as claimed in claim 1 and further comprising heating a mixture of conjugated and non-conjugated drying oils to form the partially polymerized compound.

11. A process as claimed in claim 1 wherein the reaction is carried out while refluxing the reactants at the polymerizing temperature in the presence of a solvent selected from the class consisting of monocyclic and dicyclic alpha-terpenes.

12. A process as claimed in claim 4 wherein the styrene is added periodically during the reaction.

13. A synthetic, soluble, homogeneous, air drying interpolymer produced in accordance with claim 1.

DONALD HELMSLEY HEWITT.
FRANK ARMITAGE.

(References on following page)

REFERENCES CITED

The following references are of record in the file of this patent:

UNITED STATES PATENTS

| Number | Name | Date |
|---|---|---|
| 1,975,959 | Lawson et al. | Oct. 9, 1934 |
| 2,054,019 | Jordan et al. | Sept. 8, 1936 |
| 2,225,534 | Flint | Dec. 17, 1940 |
| 2,320,724 | Gerhart et al. | June 1, 1943 |
| 2,322,837 | Ellis | June 29, 1943 |
| 2,392,710 | Wakeford et al. | Jan. 8, 1946 |
| 2,407,479 | D'Alelio | Sept. 10, 1946 |

FOREIGN PATENTS

| Number | Country | Date |
|---|---|---|
| 541,938 | Great Britain | Dec. 18, 1941 |
| 588,306 | Germany | Nov. 18, 1933 |

OTHER REFERENCES

Stevens and Armitage: "Patents, Technology and Bibliography of China Wood Oil," vol. 2, part 2, pages 2976 and 2977.

Chatfield: "Varnish Constituents," pages 12 and 17, published by Interscience Pub., N. Y., 1944.

Mattiello: "Protective and Decorative Coatings," vol. 1 (1941), pages 62 and 104, published by Wiley, N. Y.